United States Patent [19]
Kubo

[11] Patent Number: 5,850,314
[45] Date of Patent: *Dec. 15, 1998

[54] RECORDING AND/OR REPRODUCING APPARATUS FOR OPTICAL RECORDING MEDIA

[75] Inventor: Takeshi Kubo, Nanagawa, Japan

[73] Assignee: Sony Corporation, Japan

[*] Notice: The term of this patent shall not extend beyond the expiration date of Pat. No. 5,694,258.

[21] Appl. No.: 829,805

[22] Filed: Apr. 21, 1997

Related U.S. Application Data

[63] Continuation of Ser. No. 602,425, Feb. 16, 1996, Pat. No. 5,694,258.

[30] Foreign Application Priority Data

Feb. 28, 1995 [JP] Japan .................................. 7-040558

[51] Int. Cl.⁶ ..................................................... G02B 7/02
[52] U.S. Cl. ......................... 359/824; 359/813; 369/44.15
[58] Field of Search ..................................... 359/824, 823, 359/813, 814; 369/44.15, 44.16, 43, 44.11, 44.12

[56] References Cited

U.S. PATENT DOCUMENTS 5,323,378   6/1994   Kim et al. .............................. 359/824

Primary Examiner—Loha Ben
Attorney, Agent, or Firm—Ronald P. Kananen

[57] ABSTRACT

An optical pickup used in an optical recording and reproduction apparatus, wherein a wiring board formed with the wiring pattern has electrically connected to it a light receiving and emitting unit provided with a light emitting unit and an optical signal detection unit. At the same time, an object lens driving element is arranged on the wiring board. Due to this configuration, the electric connection members can be reduced and a reduction of size and a reduction of thickness of the optical pickup can be achieved.

17 Claims, 10 Drawing Sheets

RECORDING AND/OR REPRODUCING APPARATUS FOR OPTICAL RECORDING MEDIA

This application is a continuation of application Ser. No. 08/602,425 filed Feb. 16, 1996, now U.S. Pat. No. 5,694,258.

BACKGROUND OF THE INVENTION

1. Field of Utilization in Industry

The present invention relates to an optical pickup which emits a laser beam to a disk-like or sheet-like optical recording medium for recording and/or reproduction of data signals with respect to the recording medium and to an optical recording and reproduction apparatus using that optical pickup.

2. Description of the Related Art

In recent years, optical pickups have been configured as shown in FIGS. 1 and 2. In the optical pickup 40 shown in FIG. 1, a bi-axial driving unit 46, that is, a lens driving unit of an object lens 43, a laser emitting unit 47 emitting a laser beam, and an optical signal detection unit 45 comprised by for example a photodiode are fixed on a base unit 41 having mechanical strength such as for example a zinc die casting, aluminum die casting, metal plate, plastic material, etc. The bi-axial driving unit 46, the laser emitting unit 47, and the optical signal detection unit 45 are connected to a servo circuit and an RF signal processing unit via connection-use board members 48 and 49 comprised by a glass epoxy board, paper phenol board, or the like. Here, the bi-axial driving unit 46 is protected by being covered by a bi-axial cover 42. Also, this optical pickup 40 is provided with a feed guide 44. This optical pickup 40 moves the object lens 43 in the X- and Z-axial directions and emits the laser beam on the data signal recording portion on the disk-like optical recording medium.

Also, in the optical pickup 50 shown in FIG. 2, the bi-axial driving unit driving the object lens 53 which is protected by having its upper surface covered by the bi-axial cover 52 and the light receiving and emitting unit 54 are placed and affixed on a base portion 51 similar to the base portion 41. Further, the bi-axial driving unit and the light receiving and emitting unit 54 are connected to the servo circuit, the RF signal processing unit, etc. via the connection-use board members 55 and 56 similar to the above connection-use board members 48 and 49. Here, the laser receiving and emitting unit 54 is constituted by packaging a laser emitting unit emitting the laser beam and an optical signal detection unit.

In the optical pickups 40 and 50 shown in FIGS. 1 and 2, the connection-use board members 48, 49, 55, and 56 are needed, so the number of parts becomes large.

Further, these connection-use board members 48, 49, 55, and 56 must be adhered or screwed to the base portions 41 and 51 by an adhesive or binder for placement, so the reduction of the number of assembly steps at the time of the manufacture is prevented.

Further, in the optical pickups 40 and 50, parts such as the bi-axial driving unit, laser receiving and emitting unit, etc. are individually packaged, so the reduction of size and reduction of thickness are difficult.

Also, in the optical pickup 50 shown in FIG. 2, a step of once bonding and connecting the laser receiving and emitting unit 54 to the package terminals at the time of the packaging and then further mounting the same on the base portion 51 becomes necessary, so the work involved is doubled and the connection costs become high.

Further, when there are different requests from the users concerning these optical pickups 40 and 50, a variety of products satisfying the user requests must be manufactured which also increases the costs. Further, after a large amount of optical pickups are completed, there are often design changes made in for example an optical disk player or some slight changes become necessary in shape for convenience of attachment position etc. In such cases, there is a possibility that the large number of optical pickups 40 and 50 manufactured will become all wasted.

OBJECT AND SUMMARY OF THE INVENTION

The present invention was made in consideration with the above actual circumstances and has as an object thereof is to provide an optical pickup which makes the connection-use board members unnecessary, achieves a reduction of the number of parts and number of assembly steps, and, at the same time, eliminates the trouble in mounting of parts and suppresses the connection cost, enables a reduction of size and reduction of thickness, and can flexibly cope with specifications and requests of many users while maintaining low costs.

According to the present invention, there is provided an optical pickup provided with a light receiving and emitting unit comprised of a wiring board formed with a wiring pattern on which is provided a light emitting unit and an optical signal detection unit electrically connected to the wiring pattern on the wiring board and also an object lens driving means on the wiring board.

DETAILED DESCRIPTION OF THE PREFERRED EMBODIMENTS

Figure 1:
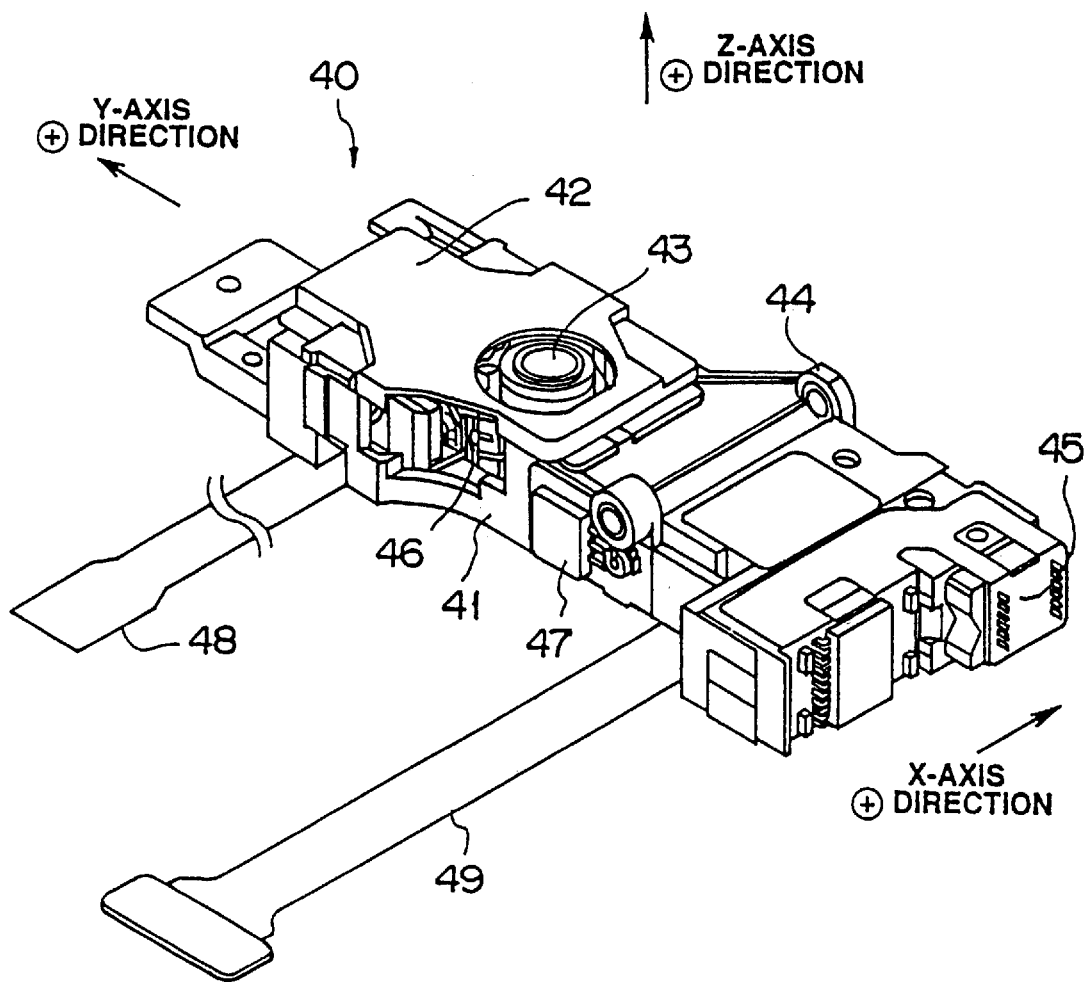
FIG. 1 is a perspective view of the outer appearance of a conventional optical pickup.
Figure 2:
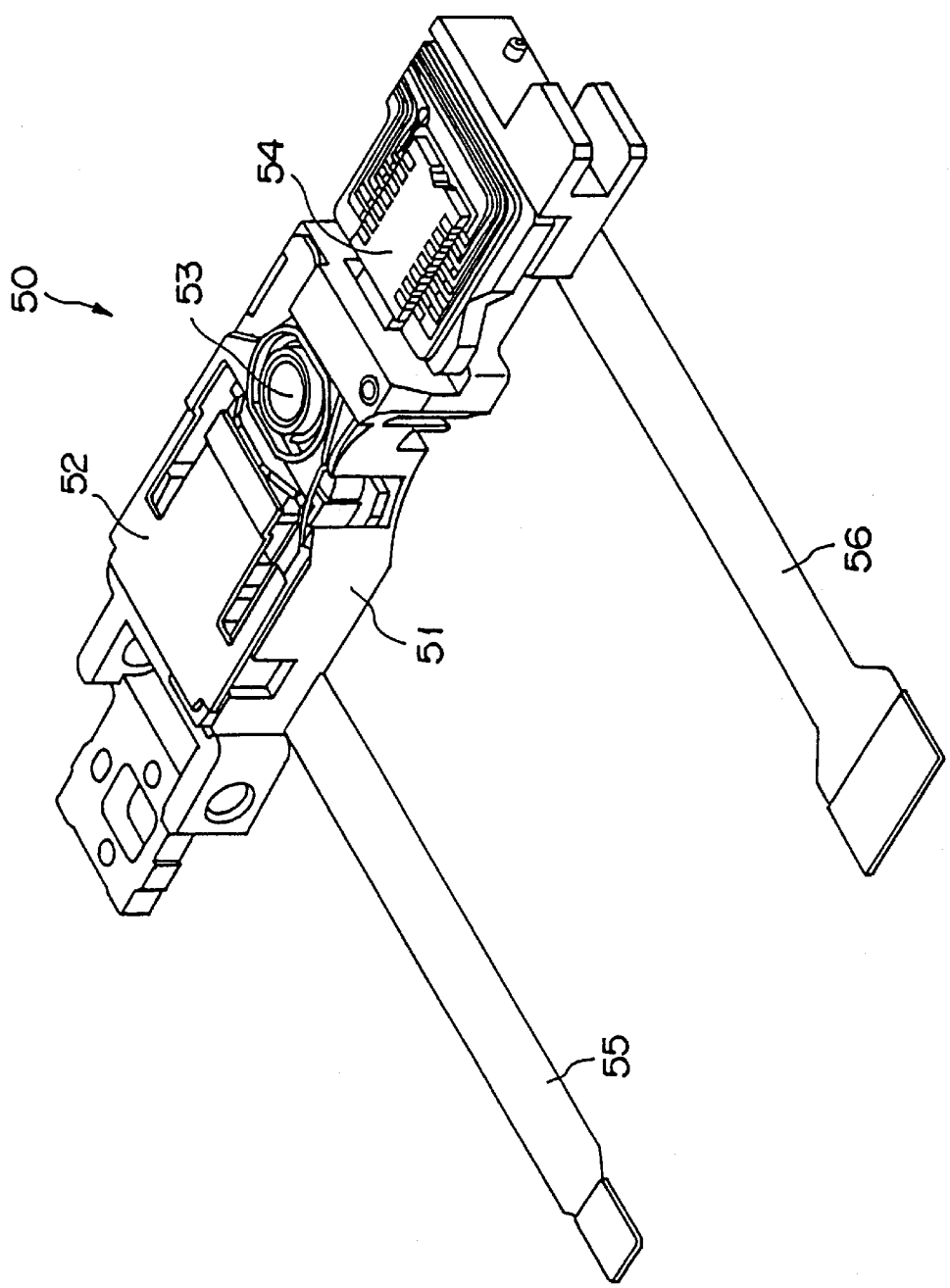
FIG. 2 is a perspective view of the outer appearance of the conventional optical pickup in which the laser receiving and emitting unit is packaged.

Below, an explanation will be made of an embodiment of an optical pickup according to the present invention by referring to the drawings. This embodiment relates to an optical pickup which emits a laser beam to a disk-like optical recording medium to perform the recording and/or reproduction of data signals with respect to the recording medium.

Figure 3:
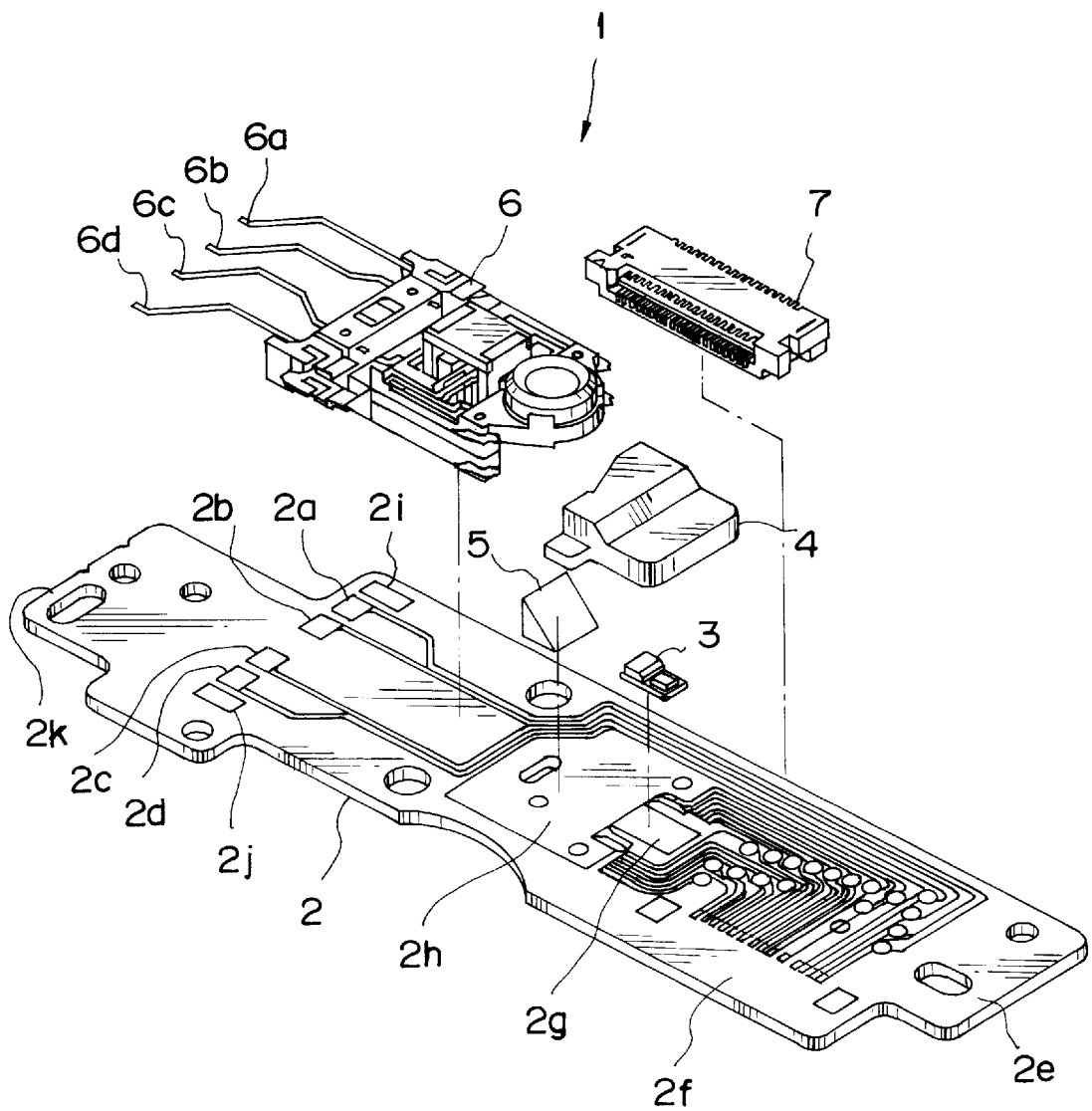
FIG. 3 is a disassembled perspective view of an embodiment of an optical pickup according to the present invention.
Figure 4:
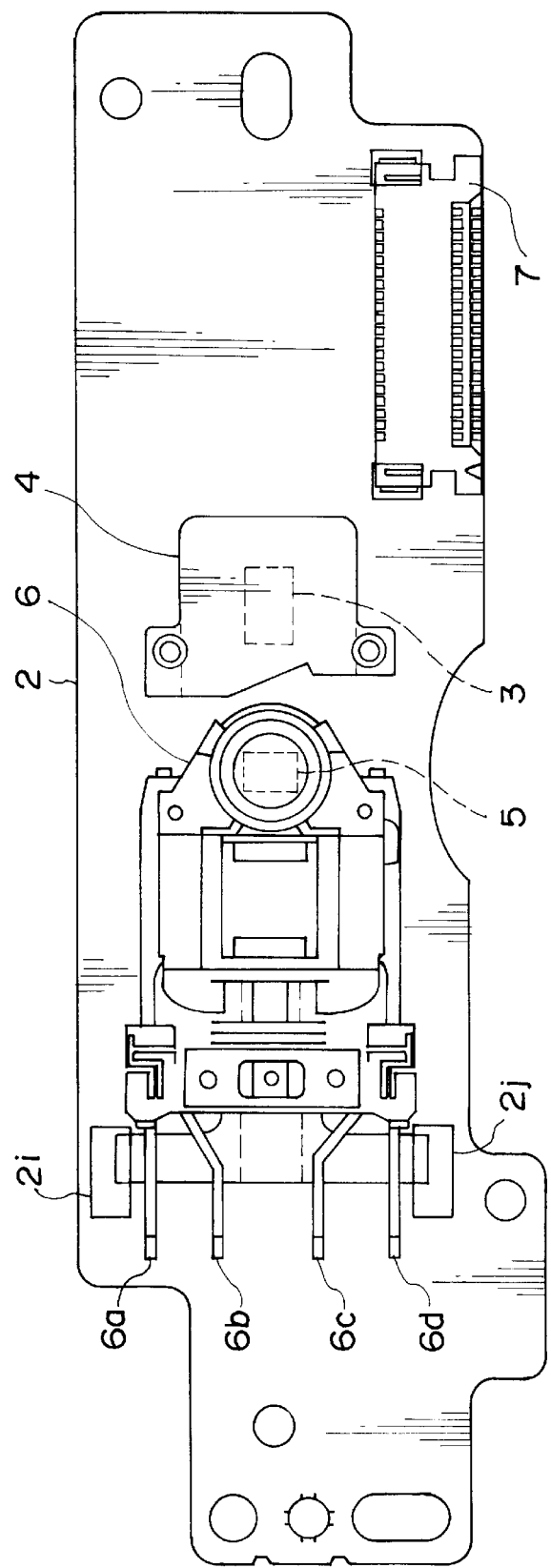
FIG. 4 is a plan view of the embodiment.
Figure 5:
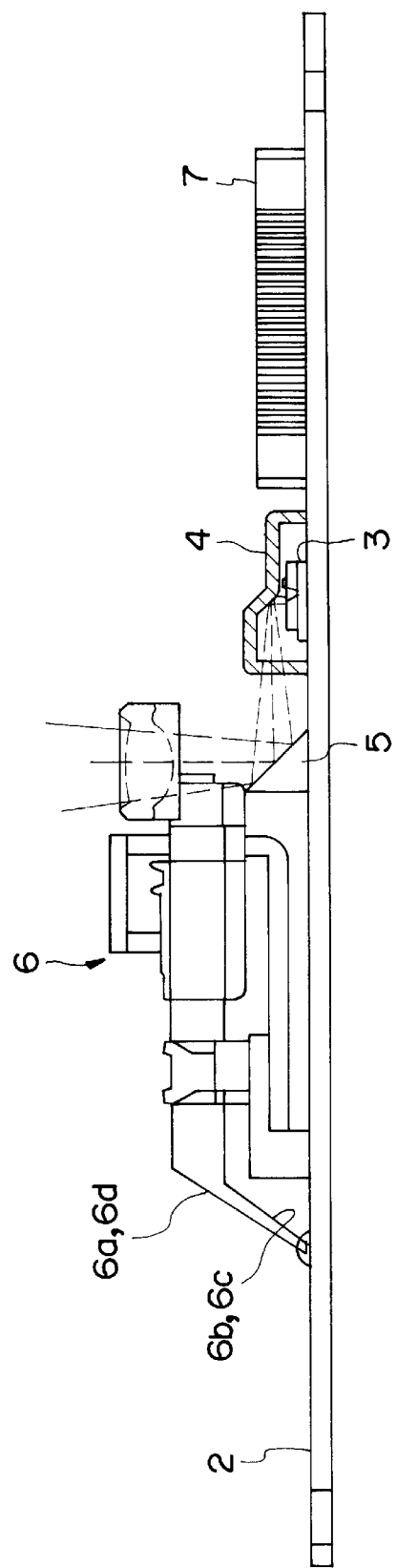
FIG. 5 is a side view of the embodiment.

As shown in FIG. 3 through FIG. 5, this optical pickup 1 is comprised of a wiring board 2 formed with the wiring pattern for connection and, placed and affixed on the same, a laser receiving and emitting unit 3 comprising a laser emitting unit and an optical signal detection unit and a bi-axial actuator 6 for driving the object lens in an optical axis direction and tracking direction electrically connected to the wiring pattern.

The wiring board 2 is made of a copper-clad laminate and has a high mechanical strength and a high heat radiating property. This wiring board 2 has mounted on it a laser receiving and emitting unit 3 by a solder paste at a position 2g, so the radiation of heat at the time of the laser emission is greatly improved. The laser receiving and emitting unit 3 is protected by a protective cover 4. The laser beam output from the light emitting unit of the laser receiving and emitting unit 3 protected by the protective cover 4 is reflected at a build-up mirror 5 disposed at the position 2h as will be explained later and built up. Then, the laser beam strikes the object lens of the bi-axial device 6 in which the connection terminals 6a, 6b, 6c and 6d are connected at the positions 2a, 2b, 2c, and 2d, which are parts of the wiring pattern, by solder paste. At the same time, parts are connected to the positions 2i and 2j. Further, this wiring board 2 has electrically connected to a fixed terminal an externally connecting connector 7 for electrically connecting the laser receiving and emitting unit 3 and the bi-axial actuator 6 to a not illustrated servo circuit and RF signal processing unit so that it is placed at the position 2f. Further, the wiring board 2 has the mounting portions 2e and 2k formed on it.

Figure 6:
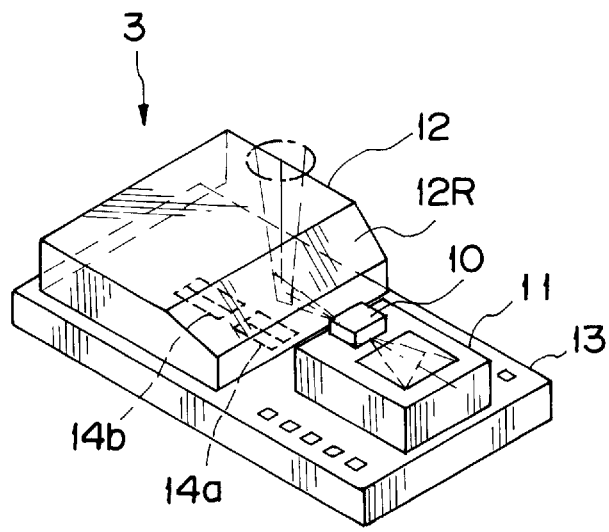
FIG. 6 is an enlarged view of a laser receiving and emitting unit used in the above embodiment.
Figure 7:
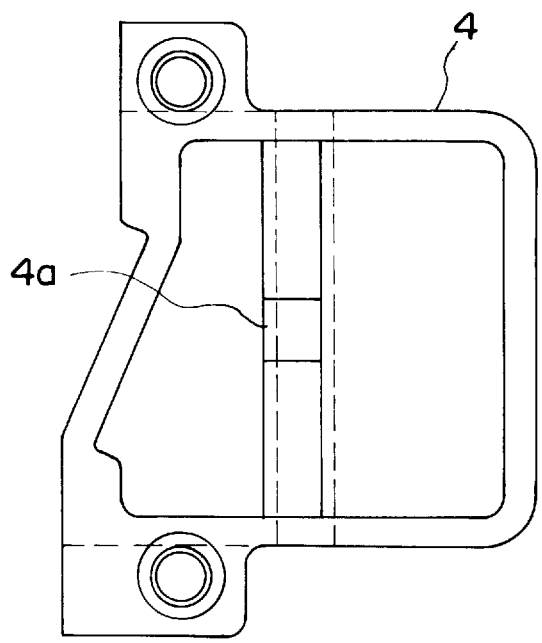
FIG. 7 is a view showing a back surface of a protection cover used in the above embodiment.

The laser receiving and emitting unit 3 comprises, as shown in FIG. 6, a laser chip 10 placed on a semiconductor device 11 provided in the optical light receiving unit, an optical prism 12, and an optical signal detection unit 14 provided with signal receiving units 14a and 14b such as photodiodes. The laser beam emitted from the laser chip 10 is reflected at the reflection plane 12R of the optical prism 12 and then bent by a bending mirror 4a of the protective cover 4 mentioned later, reaches the build-up mirror 5, is built up by the build-up mirror 5, and reaches the object lens. The reflected light from the not illustrated optical recording medium passes through the reflection plane 12R due to the difference of the direction of polarization and reaches the optical signal detection unit 13. The protective cover 4 covering and protecting this laser receiving and emitting unit 3 is formed with a shape of the back side of the housing as shown in FIG. 7. Namely, the protective cover 4 accommodates the laser receiving and emitting unit 3 in the accommodating portion and bends the laser beam which is emitted from the laser chip 10 and reflected at the reflection plane 12R of the optical prism 12 by the bending mirror 4a provided on the back side of the protection cover 4.

Figure 8:
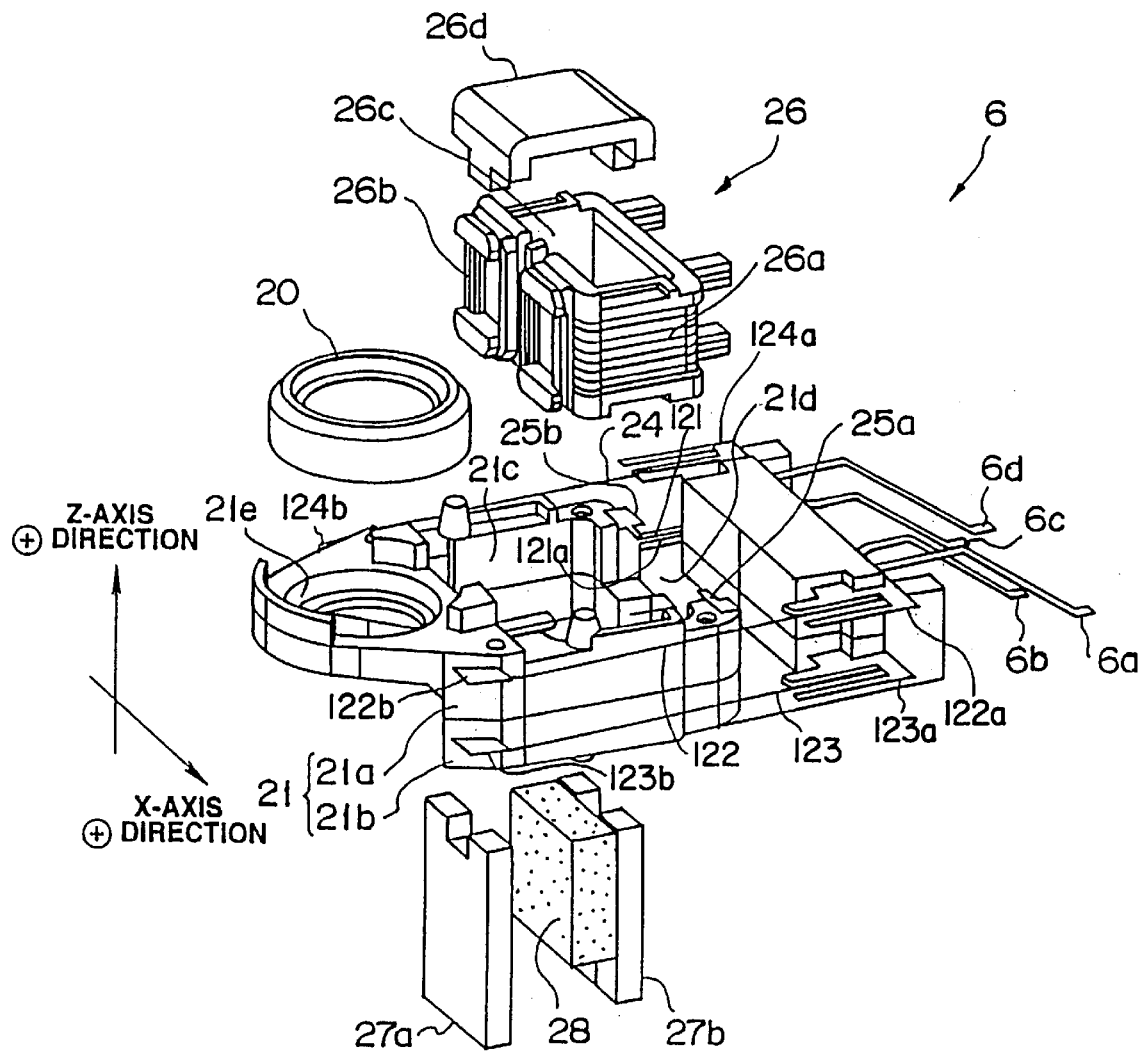
FIG. 8 is a disassembled perspective view of a bi-axial device used in the embodiment.

The bi-axial device 6 comprises, as shown in FIG. 8, a lens holder 21, a coil bobbin 26, a plurality of elastic supporting members 121, 122, 123, and 124, etc. In the lens holder 21, an object lens 20 is attached to an opening 21e formed one end serving as the free end and, at the same time, an opening 21c for attaching the coil bobbin 26 thereto is formed on the other end. The lens holder 21 is constituted by an upper holder portion 21a and a lower holder portion 21b formed by a plastic material. A recess portion 21d is formed in one part of one surface of the opening portion 21c of the lens holder 21. In this recess portion 21d, terminals 25a and 25b etc. such as a plurality of elastic supporting members 121, 122, 123, and 124, etc. are projected and electrically connected to the terminals of the coil bobbin 26 by solder. The object lens 20 is a lens which is made of glass or a plastic having a light transmission property and has two aspherical surfaces. The coil bobbin 26 is formed by a plastic or the like as a square column having a square throughhole 26c at the center and is of a size enabling it to be inserted into the opening 21c of the lens holder 21. At the same time, it has individual flanges formed at the upper and lower ends thereof. A focusing coil 26a is wound around the outer circumference of the coil bobbin 26 along the optical axis direction of the object lens 20. A pair of coil portions constituting the tracking coil 26b are formed so that they become substantially square in planar shape. A pair of coil portions constituting the tracking coil 26b are provided on one surface of the focusing coil 26a. These coil portions are continuously wound by using one lead wire. On the surface of the opposite side of the coil bobbin 26 provided with the tracking coil 26b, a plurality of pin-like terminals are provided. The starting and ending ends of the focusing coil 26a and the tracking coil 26b are wound around these. These plurality of terminals engage with the terminals 25a, 25b, etc. such as the plurality of elastic supporting members 121, 122, 123, 124, etc. when the coil bobbin 26 is attached to the lens holder 21 and electrically connected by soldering. Note that, the upper portion of the coil bobbin 26 is covered by the cover 26d. Each of the plurality of elastic supporting members 121, 122, 123, 124, etc. is formed as a thin sheet by a material having resiliency and electric conductivity. In these plurality of elastic supporting members 121, 122, 123, 124, etc., ends 121b, 122b, 123b, 124b etc. are attached to the lens holder 21. At the same time, the other ends 121a, 122a, 123a, 124a, etc. are attached to the fixing members. These plurality of elastic supporting members 121, 122, 123, 124, etc. are formed with a small width, so they can be displaced in two directions of the focusing direction (Z-axis direction) and the tracking direction (X-axis direction) shown in FIG. 8. Namely, these plurality of elastic supporting members 121, 122, 123, 124, etc. support the lens holder 21 so as to be able to move in the focusing direction, which is a direction parallel to the optical axis of the object lens 20, and the tracking direction, which is the planar direction orthogonal to the optical axis of the object lens 20. From the back side of the fixing member are projected connection terminals 6a, 6b, 6c, and 6d connected to the other ends 121a, 122a, 123a, 124a, etc. of a plurality of elastic supporting members 121, 122, 123, 124, etc. These act as the terminals for supplying the focus driving signal and the tracking driving signal from a not illustrated servo circuit. These connection terminals 6a, 6b, 6c, and 6d are connected to the positions 2a, 2b, 2c, and 2d, which are part of the wiring pattern of the wiring board 2, by solder paste as mentioned above. The focusing coil 26a and tracking coil 26b of the coil bobbin 26 are inserted into a gap having a predetermined size between a yoke portion 27a and a permanent magnet 28. Here, the permanent magnet 28 is attached to the yoke portion 27b which forms a pair with the yoke portion 27a.

As mentioned above, the laser receiving and emitting unit 3 and the bi-axial actuator 6 connect the connection terminals on the wiring pattern which is provided in advance on the wiring board 2 by solder paste or the like, so are electrically connected to the not illustrated servo circuit and RF signal processing unit via the connector 7. For this reason, the material of the connection board which had been conventionally used becomes unnecessary, so the number of parts and number of assembly steps at the time of the manufacture can be reduced. Further, the reduction of size and reduction of thickness also become possible.

The laser chip 10, which is the laser emitting unit, and the optical signal detection unit 13 are assembled and mounted on parallel surfaces on the wiring board 2 formed with the wiring pattern, so a high precision of assembly becomes possible.

Further, the externally connecting connector 7, laser emitting unit 10, and optical signal detection unit 13 can be assembled and mounted on one plane or substantially parallel planes, so the reduction of size, reduction of thickness, and lowering of cost become possible.

Figure 9:
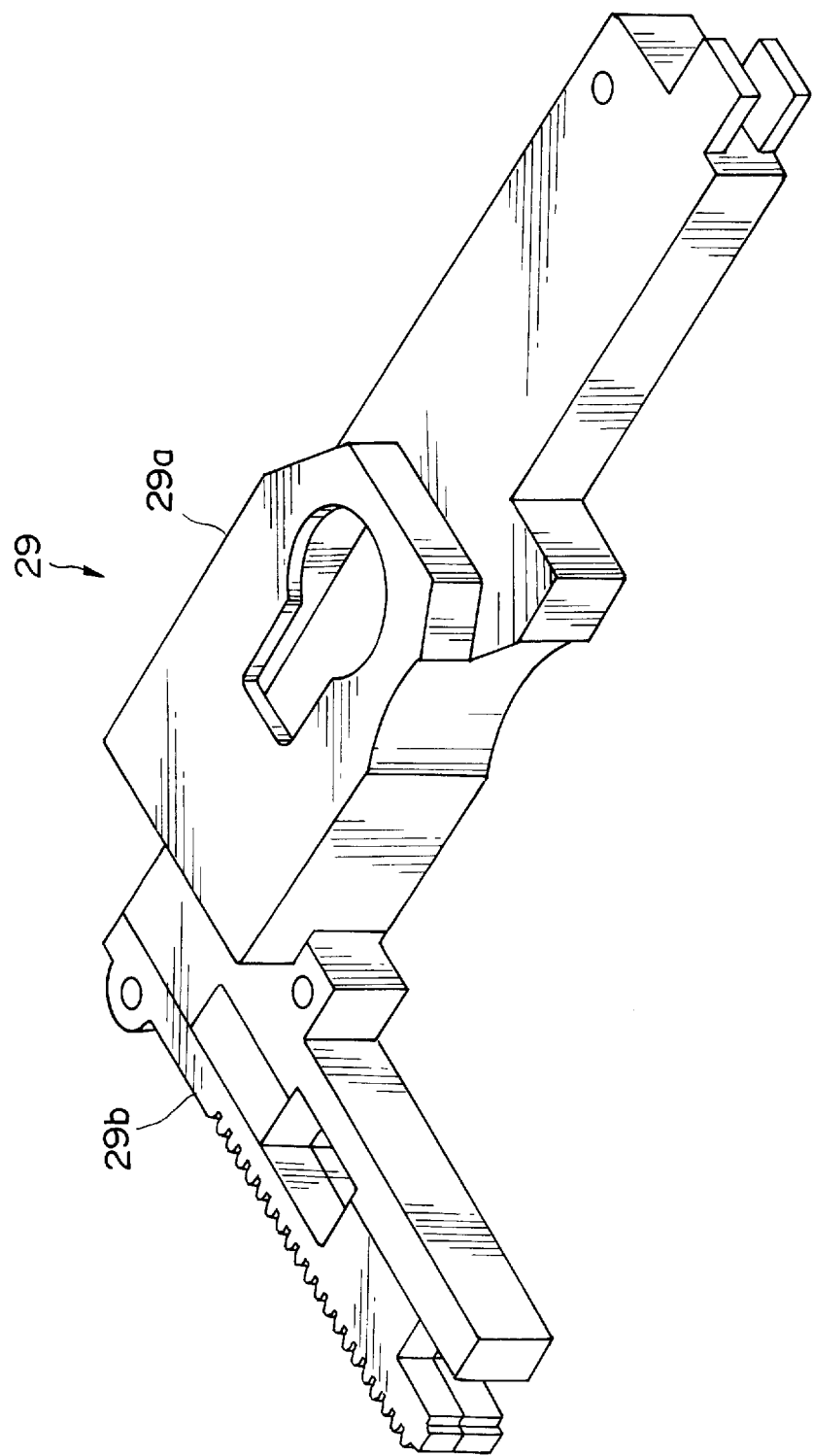
FIG. 9 is a perspective view of an outer appearance of an attachment member of the embodiment.

Also, the optical pickup assembled as shown in FIGS. 4 and 5 is accommodated in a member 29 for attachment to the body of the optical disk recording and reproduction apparatus as shown in FIG. 9 via attachment portions 2e and 2k of the wiring board 2. This attachment member 29 comprises a cover portion 29a for the bi-axial actuator, a rack and gear portion 29b for feeding the optical pickup, and a guide shaft portion for receiving a guide shaft (not illustrated) for feeding the optical pickup. For this reason, where there are differing requests for the shape of the attachment space from users or where a design change occurs in for example an optical disk player after a large amount of optical pickups are completed and the shape must be slightly changed for convenience of the attachment position, etc., it is sufficient to change just the attachment member 29 and so the productivity of the optical pickup is greatly enhanced.

Further, by mounting the laser emitting unit 10, for which a heat radiating property is required, on the wiring pattern on the wiring board 2, which is comprised of a metallic copper-clad laminate, the heat radiating property is greatly improved, the service life can be prolonged and, at the same time, the reliability can be improved. Note that, here, other than a copper-clad laminate, it is also possible to constitute the wiring board 2 by a plate of metal such as aluminum, iron, silicon steel, etc., a glass epoxy sheet, or the like or constitute the same by a ceramic. Particularly, where it is constituted by metal, the pattern width can be more finely designed than with the usual glass epoxy sheet, and the heat radiating characteristic can be improved.

Figure 10:
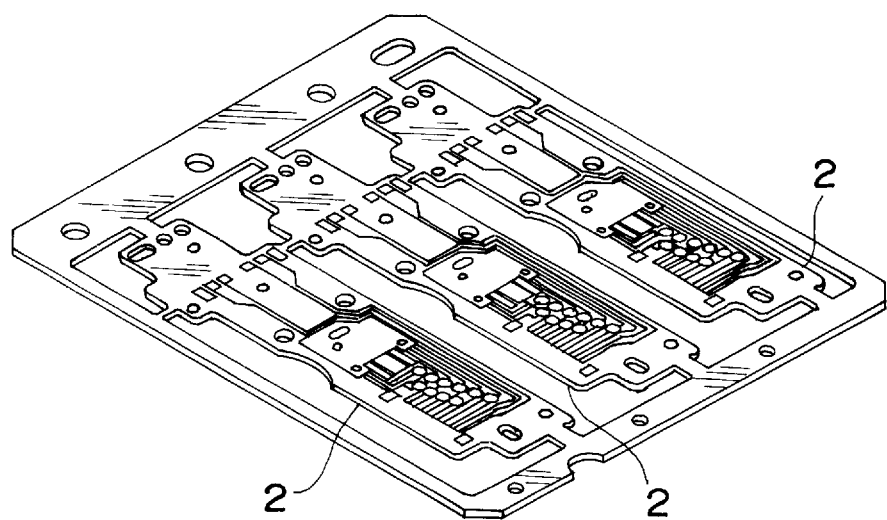
FIG. 10 is a view for explaining the manufacture of a large number of wiring boards used in the embodiment.

Further, simultaneous manufacturing of a plurality of wiring boards 2 becomes possible as shown in FIG. 10, so a reduction of cost can be achieved.

Figure 12:
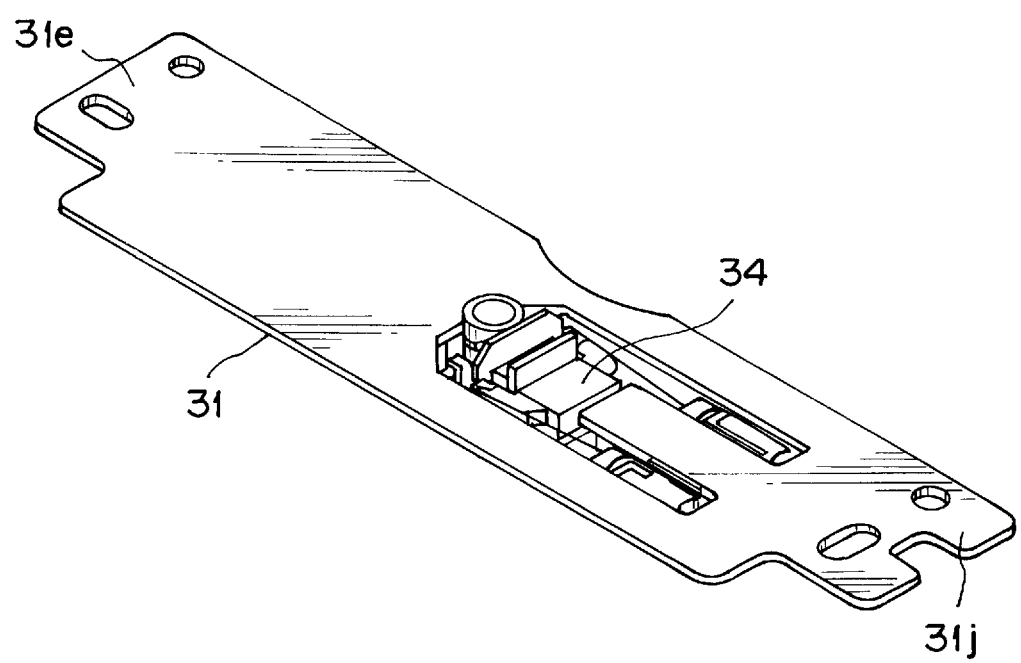
FIG. 12 is a view of the other embodiment from the back side of the wiring board.
Figure 11:
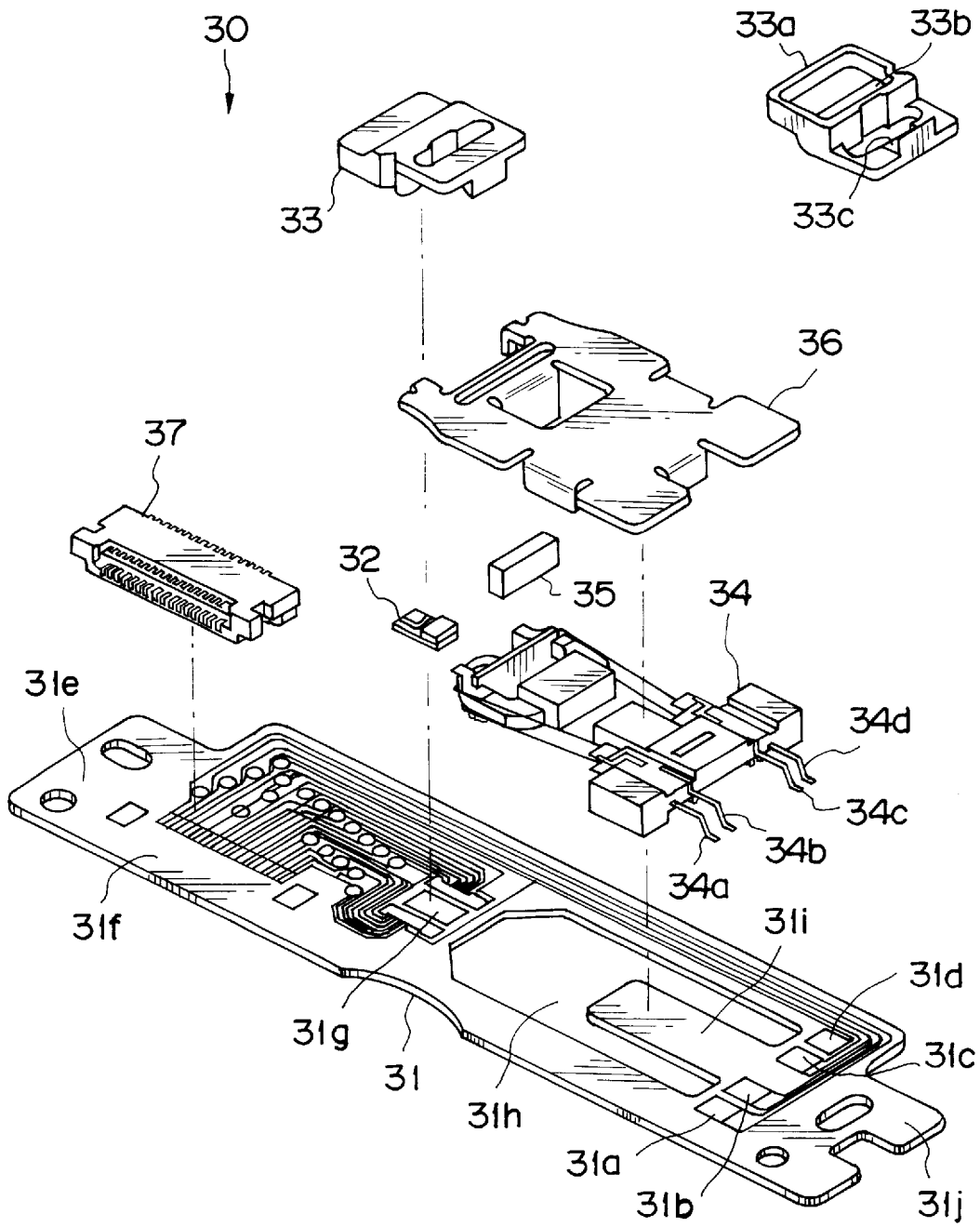
FIG. 11 is a disassembled perspective view of another embodiment of the optical pickup according to the present invention.

Note that, the optical pickup according to the present invention is not limited to the above embodiment. The optical pickup 30 as shown in FIGS. 11 and 12 can also be adopted. This optical pickup 30 also comprises a wiring board 31 formed with a wiring pattern for connection on which are provided a laser receiving and emitting unit 32 provided with a laser emitting unit and optical signal detection unit and a bi-axial actuator 34 which serves as the driving unit of the object lens.

The wiring board 31 is made a copper-clad laminate similar to the wiring board 2 of the optical pickup 1, has mechanical strength, and has also a heat radiating property.

The laser receiving and emitting unit 32 is similar in configuration to the laser receiving and emitting unit 3. Further, the bi-axial actuator 34 is similar in configuration to the bi-axial actuator 6.

The major difference of this optical pickup 30 from the optical pickup 1 resides in the point that an opening 31h is provided in the wiring board 31 with the aim of a further reduction of thickness. Namely, the bi-axial actuator 34 is arranged at a position 31i while connecting the connection terminals 34a, 34b, 34c, and 34d to the positions 31a, 31b, 31c, and 31d by solder paste so as to bury the body and is protected by the base yoke 36 so as to affix the magnet 35 for the bi-axial actuator.

The laser receiving and emitting unit 32 is protected by the protective cover 33. The laser beam output from the light emitting unit of the laser receiving and emitting unit 32 protected by the protective cover 33 is bent by the bending mirror 33b of the protective cover 33, reaches the build-up mirror 33c, is built up by the building mirror portion 33c and made incident upon the object lens 38 of the bi-axial actuator 34. The reflected light from the not illustrated optical disk is guided to the photodiode of the light receiving unit. At the position 31f of the wiring board 31, an externally connecting connector 37 for electrically connecting the laser receiving and emitting unit 32 and the bi-axial actuator 34 to a not illustrated servo circuit and RF signal processing unit is disposed.

Accordingly, this optical pickup 30 not only has the effects provided by the above optical pickup 1, but also achieves a further reduction of thickness. Note that, in the present embodiment, solder paste was used for the connection of the connection terminals 6a, 6b, 6c, and 6d and 34a, 34b, 34c, and 34d, but connection of them using solder or the like is also possible.

As described above, according to the optical pickup of the present invention, the laser receiving and emitting unit is directly arranged, attached, and fixed on the wiring board formed with the wiring pattern so that it is electrically connected to the wiring pattern. At the same time, the laser driving unit is placed, attached, and fixed. Therefore, the use of the material of the connection board is limited to the minimum level, a reduction of the number of parts and number of assembly steps is achieved and, at the same time, the connection costs are suppressed by eliminating the work of attachment of parts, the reduction of size and reduction of thickness become possible, and it becomes possible to flexibly cope with the specifications and requests of many different users while maintaining the costs low.

What is claimed is:

1. An optical recording and reproduction apparatus comprising:

a wiring board on which a wiring pattern is formed;

a light receiving and emitting unit comprising a light emitting unit and an optical signal detection unit electrically connected to the wiring pattern on said wiring board;

an object lens driving unit electrically connected to the wiring pattern on said wiring board for driving an object lens, wherein light from said light receiving and emitting unit is directed by said object lens to an optical recording medium; and a supporting member comprising a cover portion for accommodating said light receiving and emitting unit and said object lens driving unit arranged on the wiring board, and a rack and gear portion.

2. An apparatus according to claim 1, wherein said light receiving and emitting unit comprises:

said light emitting unit which comprises a semiconductor laser, an optical prism having a reflection surface, and said optical signal detection unit which comprises a photodiode.

3. An apparatus according to claim 1, wherein said light receiving and emitting unit is covered by a protective cover member comprising a bending mirror on a back surface thereof.

4. An apparatus according to claim 1, wherein said object lens driving unit supports said object lens by a plurality of elastic supporting members having electric conductivity.

5. An optical recording and reproduction apparatus as in claim 1, wherein an opening is provided in said wiring board, and one part of the object lens driving unit is arranged in this opening.

6. An optical recording and reproduction apparatus as in claim 1, wherein said wiring board is constituted by a metal plate.

7. An apparatus as claimed in claim 1, further comprising a build-up mirror disposed between said light emitting unit and said object lens which is held and driven by said object lens driving unit.

8. An apparatus as claimed in claim 1, further comprising an externally connecting connector disposed on said wiring board for electrically connecting said wiring pattern to an external circuit.

9. An apparatus as claimed in claim 8, wherein said externally connecting connector, said light emitting unit and said optical signal detection unit are disposed in a common plane.

10. An apparatus as claimed in claim 1, wherein said supporting member further comprises a guide shaft portion for receiving a guide shaft along which said apparatus moves.

11. An apparatus as claimed in claim 1, wherein said object lens has two aspherical surfaces.

12. An apparatus as claimed in claim 1, wherein said wiring pattern comprises a plurality of connection pads to which leads from said light receiving and emitting unit and said object lens driving unit are electrically connected.

13. An apparatus as claimed in claim 1, wherein said object lens driving unit is a biaxial actuator for driving said object lens in a focusing direction and in a tracking direction.

14. An apparatus as claimed in claim 13, wherein said object lens driving unit further comprises a focusing coil wound around a yoke on which is disposed a permanent magnet.

15. An apparatus as claimed in claim 14, wherein said object lens driving unit further comprises a plurality of tracking coils disposed on said focusing coil and having parallel central axes which are perpendicular to a central axis of said focusing coil.

16. An optical recording and reproduction apparatus comprising:

a wiring board on which a wiring pattern is formed;

a light receiving and emitting unit comprising a light emitting unit and an optical signal detection unit electrically connected to the wiring pattern on said wiring board; and an object lens driving unit electrically connected to the wiring pattern on said wiring board for driving an object lens, wherein light from said light receiving and emitting unit is directed by said object lens to an optical recording medium;

wherein said wiring pattern comprises a mounting pad on which said light receiving and emitting unit is mounted, said mounting pad being thermally conductive so as to conduct heat generated by said light receiving and emitting unit.

17. An apparatus as claimed in claim 16, wherein said wiring pattern comprises a plurality of connection pads to which leads from said light receiving and emitting unit and said object lens driving unit are electrically connected.

* * * * *